United States Patent
Olivo et al.

(10) Patent No.: US 11,418,039 B2
(45) Date of Patent: Aug. 16, 2022

(54) APPARATUS AND METHODS FOR REDUCING GENERATOR FREQUENCY VARIATION

(71) Applicant: Flexgen Power Systems, Inc., Durham, NC (US)

(72) Inventors: Tony Olivo, Raleigh, NC (US); Pasi Taimela, Wake Forest, NC (US); Robert William Johnson, Jr., Raleigh, NC (US); Mengbin Yang, Cary, NC (US); Preston Miller, Bremerton, WA (US)

(73) Assignee: Flexgen Power Systems, Inc., Durham, NC (US)

( * ) Notice: Subject to any disclaimer, the term of this patent is extended or adjusted under 35 U.S.C. 154(b) by 0 days.

(21) Appl. No.: 16/968,098

(22) PCT Filed: Feb. 6, 2019

(86) PCT No.: PCT/US2019/016765
§ 371 (c)(1),
(2) Date: Aug. 6, 2020

(87) PCT Pub. No.: WO2019/157005
PCT Pub. Date: Aug. 15, 2019

(65) Prior Publication Data
US 2021/0036638 A1    Feb. 4, 2021

Related U.S. Application Data

(60) Provisional application No. 62/627,307, filed on Feb. 7, 2018.

(51) Int. Cl.
*H02P 9/02* (2006.01)
*G05B 19/042* (2006.01)
(Continued)

(52) U.S. Cl.
CPC ............ *H02J 3/381* (2013.01); *G05B 19/042* (2013.01); *H02J 3/32* (2013.01); *H02J 3/46* (2013.01);
(Continued)

(58) Field of Classification Search
CPC . H02P 9/02; G05B 19/042; G05B 2219/2639; H02J 3/381; H02J 2300/10; H02J 3/388; H02J 3/46; H02J 3/32
See application file for complete search history.

(56) References Cited

U.S. PATENT DOCUMENTS 6,164,057 A * 12/2000 Rowen ...................... F02C 9/54
                                                                       60/39.27
2014/0195137 A1 * 7/2014 Fischer ................. B60W 10/06
                                                                         701/110
(Continued)

FOREIGN PATENT DOCUMENTS

WO    WO2012/159678    11/2012

OTHER PUBLICATIONS

International Search Report and Written Opinion, PCT/US2019/016765, dated Apr. 16, 2019; 2 pages.

*Primary Examiner* — Thomas C Lee
*Assistant Examiner* — Charles Cai
(74) *Attorney, Agent, or Firm* — Stanek Lemon Crouse & Meeks, P.A.

(57) ABSTRACT

A system includes a generator configured to be electrically coupled to a grid, an engine configured to drive the generator, and a solid state generator coupled between the grid and an energy storage device. The system further includes a bias controller configured to detect a frequency of the grid and to responsively provide a bias signal to a speed controller of the engine. The bias controller may include a frequency bias controller configured to generate a frequency bias load
(Continued)

sharing signal responsive to the detected frequency of the grid and a load sharing controller that receives the frequency bias load sharing signal and that generates the bias signal responsive to the load sharing signal.

8 Claims, 4 Drawing Sheets

(51) Int. Cl.
*H02J 3/38* (2006.01)
*H02J 3/46* (2006.01)
*H02J 3/32* (2006.01)

(52) U.S. Cl.
CPC ........ *H02P 9/02* (2013.01); *G05B 2219/2639* (2013.01); *H02J 2300/10* (2020.01)

(56) References Cited

U.S. PATENT DOCUMENTS

| | | | |
|---|---|---|---|
| 2016/0160839 A1* | 6/2016 | Wang | F03D 9/255 |
| | | | 290/44 |
| 2016/0329713 A1* | 11/2016 | Berard | H02J 3/383 |
| 2019/0152470 A1* | 5/2019 | Liu | B60K 6/442 |

* cited by examiner

LOAD SHARE
(DIFFERENCE FROM AVERAGE METHOD)

APPARATUS AND METHODS FOR REDUCING GENERATOR FREQUENCY VARIATION

BACKGROUND

In island grid applications, generation assets, such as diesel or gas powered generators and turbines, may experience transient load conditions that can cause changes in grid frequency and voltage. These transient conditions may include, for example, large load changes and sudden changes in power source availability, such as a generation asset shutting down or becoming unavailable. Such variations in line frequency or voltage may result in dropped loads or damaged equipment.

Some island grids may be supported by one generation asset sized to support the peak load and to respond to large transient load steps. These assets may operate at very high utilization rates, for example, 24 hours a day, 7 days a week, 365 days a year, but at relatively low real load factors, e.g., between 15-50%, for extended periods of off-peak time. U.S. Pat. No. 9,312,699 to Taimela et al, assigned to the assignee of the present application, describes use of a generator in combination with an electronic converter-based Solid State Generator (SSG), which is used to support operation of the generator using energy from an energy storage device, such as a battery or capacitor bank, provided to the grid via a power converter. The SSG may be used to provide transient load support and to provide power to the grid when the generator is inactive.

SUMMARY

According to some embodiments, a system includes a generator configured to be electrically coupled to a grid, an engine configured to drive the generator, and a solid state generator electrically coupled between the grid and an energy storage device. The system further includes a bias controller configured to detect a frequency of the grid and to responsively provide a bias signal to a speed controller of the engine. The bias controller may include a frequency bias controller configured to generate a frequency bias load sharing signal responsive to the detected frequency of the grid and a load sharing controller that receives the frequency bias load sharing signal and that generates the bias signal responsive to the load sharing signal. The frequency bias controller may be configured to control a load sharing line that is used to provide a customer load sharing signal to the load sharing controller. The frequency bias controller may be configured to generate the frequency bias load sharing signal responsive to the detected frequency, a state of charge of the energy storage device and an active power output of the SSG. The bias controller may be configured to provide the bias signal responsive to a load change in advance of a response of the speed controller to the load change.

DETAILED DESCRIPTION

Figure 1:
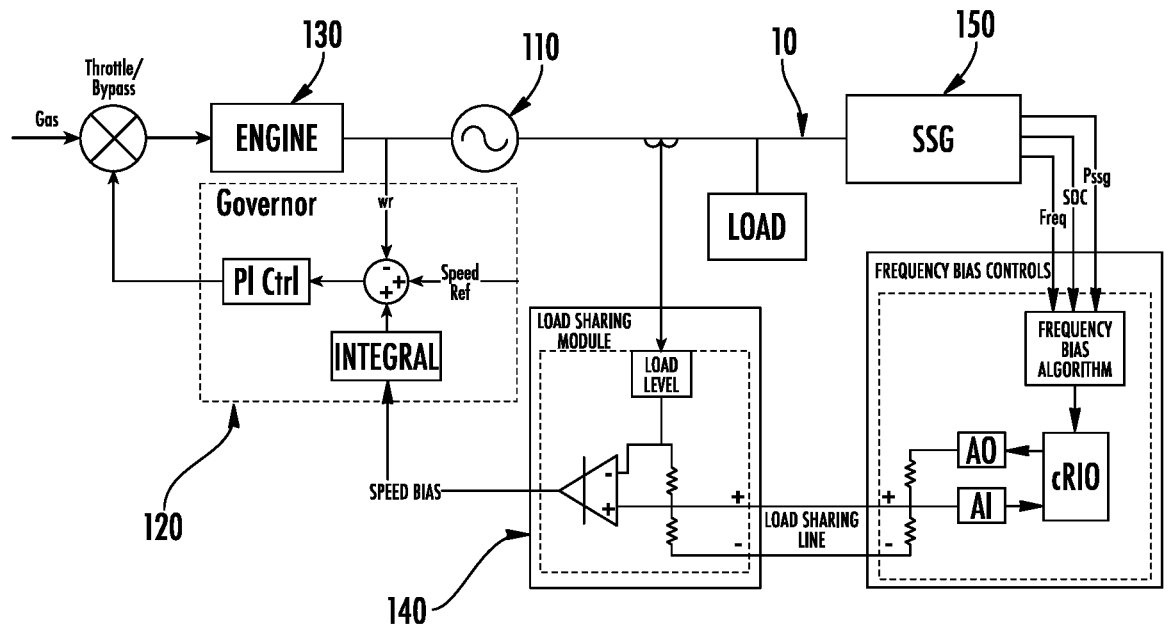
FIG. 1 illustrates a system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

When a substantial load is connected to the grid, the resultant voltage or frequency variation can be mitigated by using a solid state generator (SSG) that includes a converter and attached energy storage (e.g., a battery and/or supercapacitor) to provide transient load support. The greater load support provided by the SSG, the variations in voltage and frequency will be less. However, with this reduced variation in voltage and frequency, the less error signal is detected by the generator controls to make the adjustment to the new load conditions. This can be observed in generation assets, such as diesel or gas powered generators and turbines. In particular, gas powered generators, turbo-charged generators and turbines can experience considerable delayed response to an increased throttle command. This response delay can increase the required stored energy coupled to the SSG to mitigate the transient variation.

Generators operating in island grid mode may be subject to large load steps which are a significant percentage of the generator capacity. Such large load steps result in significant frequency and/or load voltage variations that can cause the generation asset to shut down or becoming unavailable. The loss of the generation asset could result in further load bus variations in line frequency or voltage which may result in dropped loads, damaged equipment or grid failure resulting from cascade failures.

FIG. 1 illustrates a system according to some embodiments. The system includes a generator 110 configured to be coupled to a grid 10. The generator is mechanically coupled to a prime mover, which may be a natural gas fueled engine 130. The engine 130 is equipped with a governor 120 that controls the fuel to the engine cylinders so as to control the speed of the unit, holding the speed constant for all conditions of load imposed on the generator 110. When the load is increased, the resultant change is sensed by the governor 120 which responds by adjusting the throttle to return the speed to the desired set point. With increased error, the governor 120 responds with greater throttle adjustment. With engines that have a delayed response to a throttle command, such as natural gas fueled engine or turbine, the delay results in larger and longer frequency and voltage variations with respect to a load change.

An SSG 150 connects energy storage, such as a battery, to the grid 10 using, for example, a power converter circuit. When the SSG 150 is operating in a transient support mode, the longer the delay in responding to a change in load will require larger amounts of the stored energy connected to the SSG 150. When tight control over the grid 10 is required there may be a tradeoff between reducing the error as seen by the governor 120 and the amount of stored energy required. This tradeoff may be exacerbated by the delayed response to throttle commands of some engine types.

Figure 2:
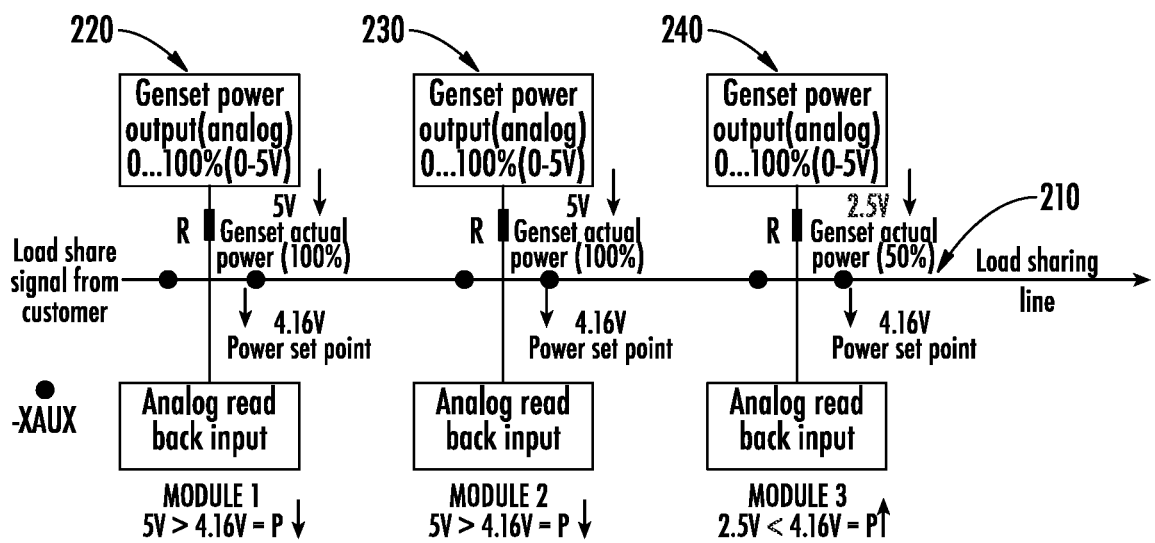
FIG. 2 illustrates load share signaling among generators.

Governors are commonly available with a load sharing module 140 that facilitates the load sharing of two or more generators operating in parallel. The operation of generators using a load sharing module is illustrated in FIG. 2. As the schematic diagram illustrates, paralleled generator 220, 230, 240 are connected to a common load sharing line 210. In this example, each generator 220, 230, 240 delivers an analog output (0-5V), which is determined by its load level, where full load is 5V and no load is 0V. The analog outputs will be averaged to a common load sharing value on the load sharing line 210, using identical pull up resistors. The load sharing module will also read the analog input value on the common load sharing line 210. Internally, the load sharing module may include a differential amplifier to generate a bias signal (e.g. a speed or frequency bias signal), in order to adjust the generator power.

Shown in FIG. 2 are a first generator 220 and a second generator 230 with their outputs at 5V since their output is at 100% while generator 240 is at 2.5V since their output is at 50% of full load. With the averaging resistor, they read the common line back as 4.16V. In response, the first generator 220 and the second generator 230 see the voltage difference as 0.84V and will reduce their output power in response to this negative bias. Simultaneously, a third generator 240 sees the voltage difference as −1.66V and will increase its output power in response to this positive bias. The generators 220, 230, 240 respond to the differences between their output and the average output of the paralleled generators so the net result is that each of the generators 220, 230, 240 will provide the same percentage of the aggregated generator load.

In some embodiments, a solid state generator (SSG) comprising an energy storage and associated converter can utilize this commonly available load sharing input to enhance the error signal provided to the governor of the generator beyond that which the governor can extract from the normal frequency and voltage variations during load transients. The SSG can provide greater control over the magnitude of frequency and voltage variations which would normally mask the transient from the governor. In some embodiments, the SSG will provide a signal to a governor having a load sharing input by providing the appropriate magnitude bias to cause the governor to adjust the throttle to the new load conditions. For example, in response to a load step, the SSG may signal the governor to increase throttle far in advance and/or greater magnitude than the governor can determine based on normally available inputs. The result is the generator being able to supply a substantial percentage of the load step during the transient without any significant frequency or voltage variation. Since the generator supplies larger percentage of the transient load step, the stored energy connected to the SSG can be reduced.

Referring again to FIG. 1, a frequency bias controller 160 is coupled to a load sharing line that is input to the load share module 140. The frequency bias controller 160 operates responsive to an SSG 150. The frequency bias controller 160 implements a frequency bias algorithm responsive to an output from the SSG 150 that provides an input to the load sharing line input to the load sharing module 140, which responsively produces a speed bias input to the governor 120. The output from the SSG 150 may include, for example, information about the frequency of the AC grid 10, an active power output Pssg of the SSG 150 and a state of charge (SOC) of the energy storage of the SSG 150.

Figure 3:
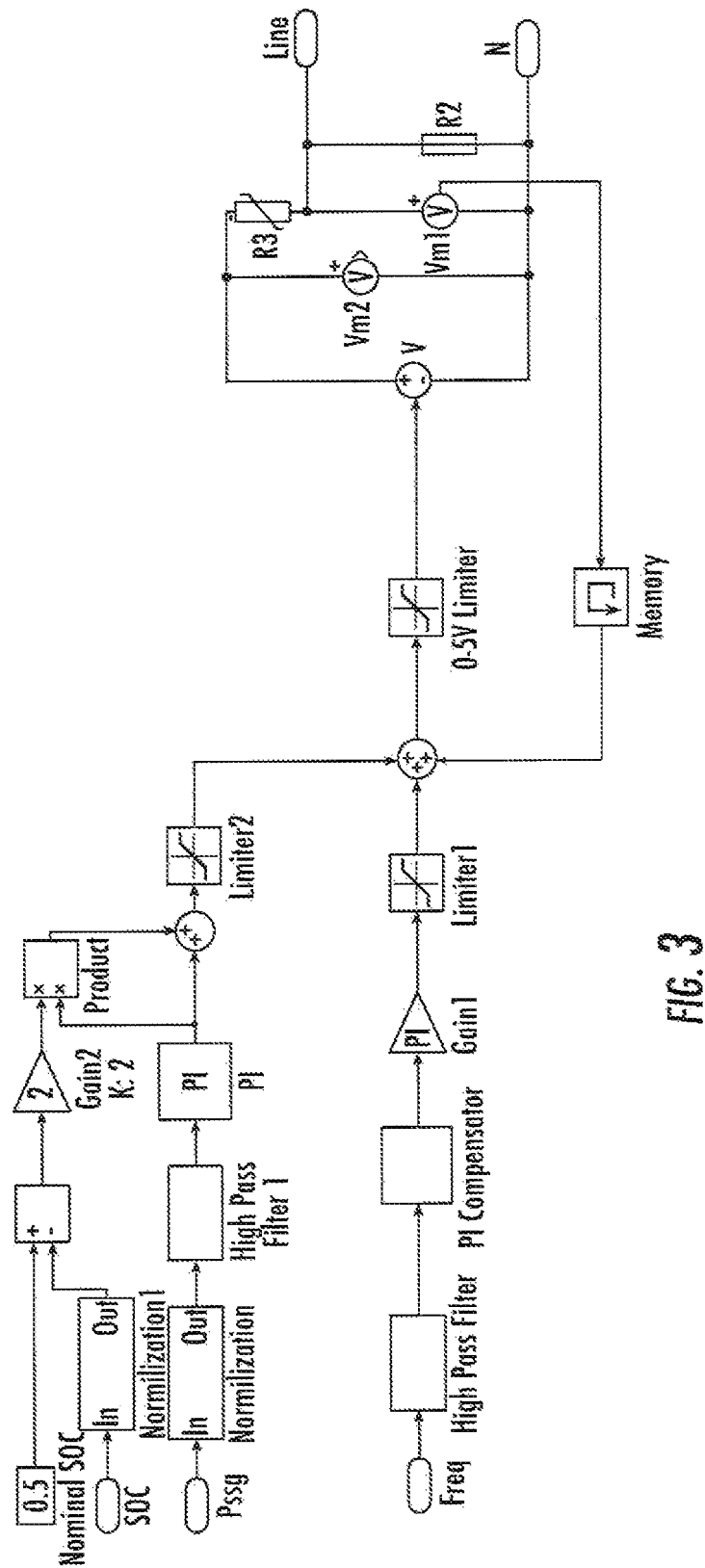
FIG. 3 illustrates a control architecture for generator bias control according to some embodiments.

In FIG. 3, an exemplary generator bias control approach is presented. The bias control takes the input of AC bus frequency, SSG active power, and state of charge in the energy storage system to optimize the controls. The bias controls can make the generator response faster, in order to reduce orminimize the variation on the bus (grid). A high pass filter may be added to create the frequency variance, to feed into the PI controller. If an integrator already exists in the load share module, there may be no need for extra integration in the frequency compensator. Although a bias signal can be provided for load step and load drop events, this example provides for positive bias injection to compensate for load step transients. The load drop events may be less problematic for natural gas fueled engines.

The implementation of this strategy of an SSG providing bias control to signal the governor of a pending load change in advance of this information by normal control inputs can help optimize energy usage and State of Charge (SOC) management. The inclusion of SOC into consideration, can allow the SSG to operate at higher gain when the SOC is lower. This can enable the SSG to tailor the magnitude of bias to provide a reduced or minimum frequency or voltage variation based on available energy store (SOC) connected to the SSG.

Although the invention was described using the load sharing module, it is clear that the inventive concepts could be used or modified to use another input to the generator which can be used to provide advance information of load change resulting in increased throttle in advance of a normal governor response. Therefore, using an alternative communication line to governor, the switch engine governor/speed controller may be switched to a mode where the throttle is pegged 100% open/closed during a transient condition. This allows the hybrid power train (SSG) to take 100% over the control of frequency and voltage of the bus. In a fully optimized hybrid mode, the engine may deliver nearly 100% of power and energy based on its operating point by substantially bypassing the engine speed control, which can result in desirable power output with reduced or minimal storage cost. In this alternate mode, after the SSG has handled the transient and observe steady state condition, the storage controller can re-enable the normal governor/speed controller operation mode.

Figure 4A:
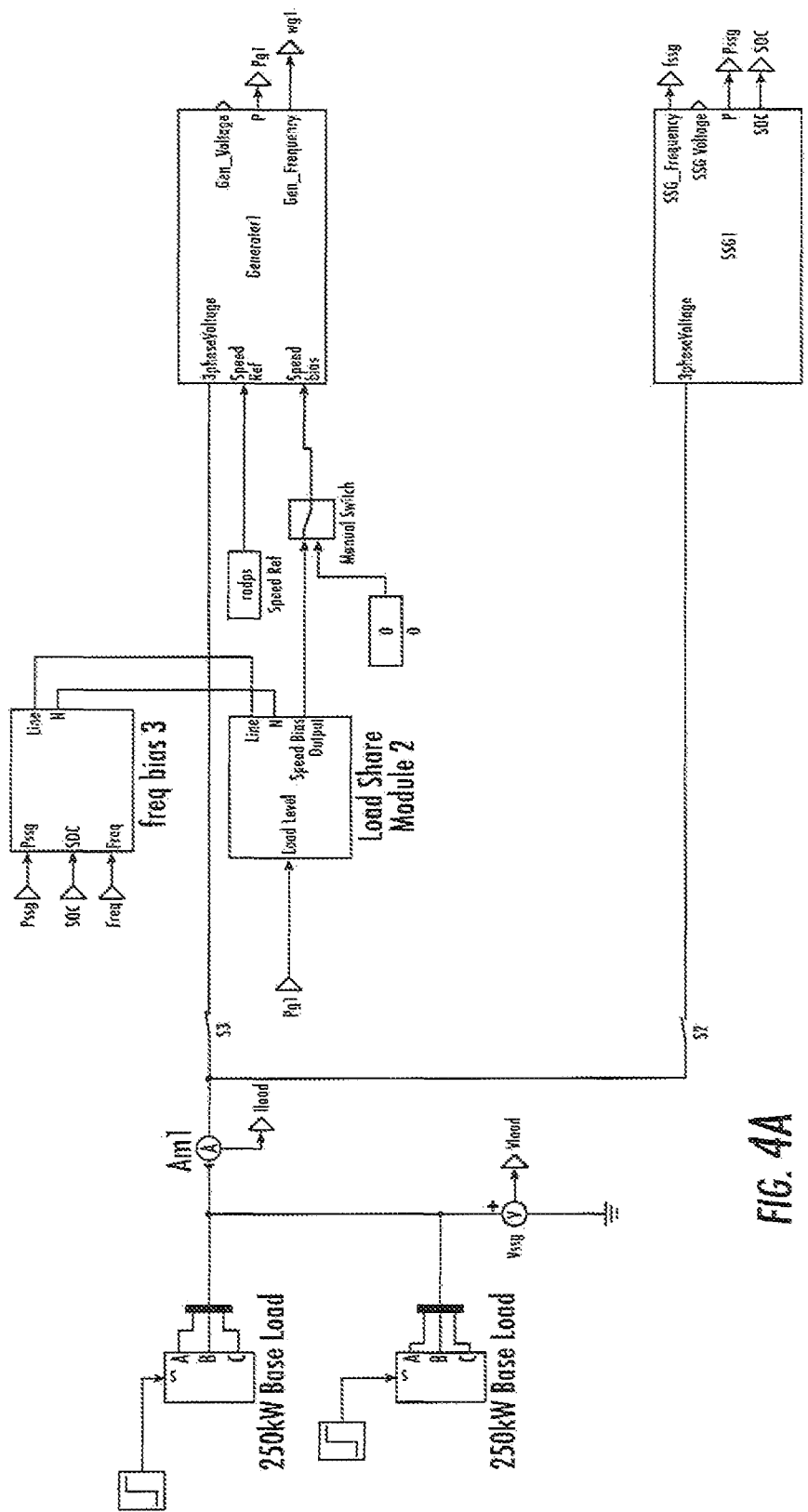
FIGS. 4A and 4B illustrate a simulation model and performance characteristics for bias control according to some embodiments.
Figure 4B:
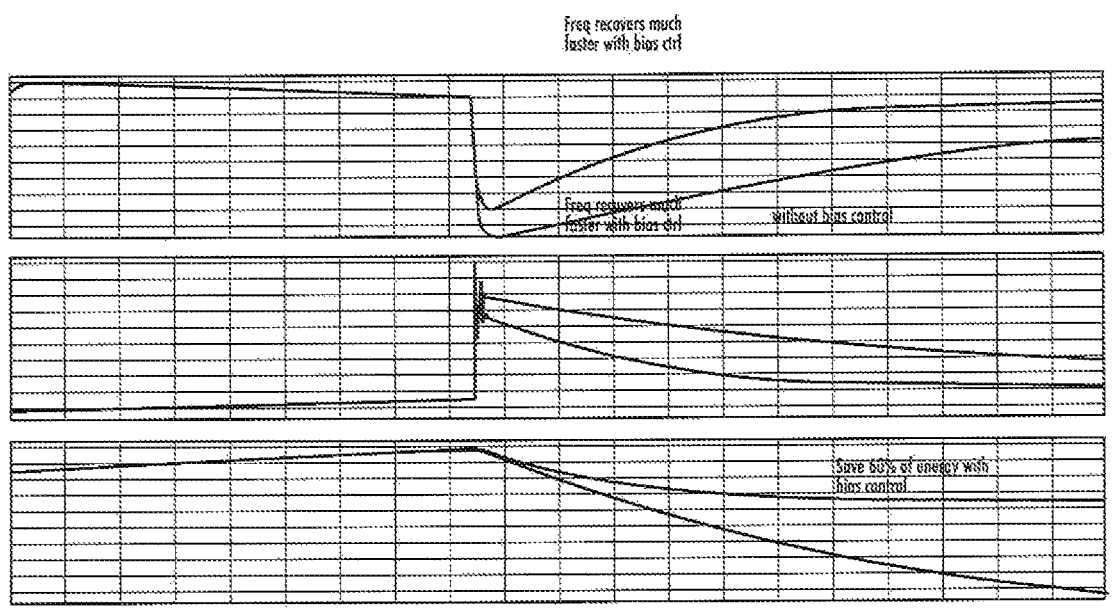

FIGS. 4A and 4B illustrate a simulation of the inventive concept illustrating the response with and without bias controls. It can be seen in FIG. 4B that frequency recovers much faster with bias control than without it. In the illustrated simulation, using bias control may result in a 60% savings on the required energy store for the transient event.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A system comprising:
   a plurality of generators configured to be electrically coupled to a grid;
   a plurality of engines configured to drive the plurality of generators respectively;
   a solid state generator (SSG) configured to couple an energy storage device to the grid; and
   a bias controller coupled to the SSG and configured to detect a frequency of the grid and to responsively provide a bias signal that adds to a speed reference signal for a speed controller of at least one of the plurality of engines, wherein the bias controller comprises:
   a frequency bias controller configured to generate a frequency bias load sharing signal responsive to the detected frequency of the grid; and
   a load sharing controller that receives the frequency bias load sharing signal via a load sharing line coupled to the plurality of generators, wherein the load sharing controller generates the bias signal responsive to the load sharing signal.

2. The system of claim 1, wherein the frequency bias controller is configured to control the load sharing line that is used to provide a customer load sharing signal to the load sharing controller.

3. The system of claim 1, wherein the frequency bias controller is configured to generate the frequency bias load sharing signal responsive to the detected frequency, a state of charge of the energy storage device and an active power output of the SSG.

4. The system of claim 1, wherein the bias controller is configured to provide the bias signal responsive to a load change in advance of a response of the speed controller to the load change.

5. A method of operating a system comprising a plurality of generators configured to be electrically coupled to a grid, a plurality of engines configured to drive the plurality of generators respectively and a solid state generator (SSG) that couples the grid to an energy storage device, the method comprising:
   detecting a frequency of the grid; and
   providing a bias signal that adds to a speed reference signal for a speed controller of at least one of the plurality of engines responsive to the detected frequency, wherein providing a bias signal comprises:
   generating a frequency bias load sharing signal responsive to the detected frequency;
   providing the frequency bias load sharing signal to a load sharing controller for at least one of the plurality of generators via a load sharing line coupled to the plurality of generators; and
   generating the bias signal from the load sharing controller responsive to the frequency bias load sharing signal.

6. The method of claim 5, wherein generating the frequency bias load sharing signal comprises controlling the load sharing line that is used to provide a customer load sharing signal to the load sharing controller.

7. The method of claim 5, wherein generating the frequency bias load sharing signal comprises generating the frequency bias load sharing signal responsive to the detected frequency, a state of charge of the energy storage device and an active power output of the SSG.

8. The method of claim 5, wherein providing the bias signal to the speed controller comprises providing the bias signal responsive to a load change in advance of a response of the speed controller to the load change.

* * * * *